(12) United States Patent
Kajino et al.

(10) Patent No.: US 7,704,612 B2
(45) Date of Patent: Apr. 27, 2010

(54) JIG FOR ELECTRONIC PART FIRING

(75) Inventors: Hitoshi Kajino, Saitama (JP); Tatsuhiko Uchida, Fukuoka (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 32 days.

(21) Appl. No.: 11/547,393

(22) PCT Filed: Mar. 31, 2005

(86) PCT No.: PCT/JP2005/006269

§ 371 (c)(1),
(2), (4) Date: Sep. 29, 2006

(87) PCT Pub. No.: WO2005/095303

PCT Pub. Date: Oct. 13, 2005

(65) Prior Publication Data

US 2007/0207334 A1  Sep. 6, 2007

(30) Foreign Application Priority Data

Mar. 31, 2004  (JP) ............................ 2004-106281

(51) Int. Cl.
B32B 9/00 (2006.01)
B32B 19/00 (2006.01)
B32B 18/00 (2006.01)
B05C 13/00 (2006.01)
H05B 3/68 (2006.01)
F27D 5/00 (2006.01)

(52) U.S. Cl. .................. 428/702; 118/500; 428/325; 428/701; 432/258

(58) Field of Classification Search ................ 118/500; 219/444.1; 428/325, 701, 702; 432/258
See application file for complete search history.

(56) References Cited

U.S. PATENT DOCUMENTS 4,310,480 A * 1/1982 Fujimoto et al. ............ 264/628

FOREIGN PATENT DOCUMENTS

| JP | 3-177383 | 8/1991 |
| JP | 2003-73183 | 3/2003 |
| JP | 2003-238246 | 8/2003 |

OTHER PUBLICATIONS

Machine English translation of Izutsu et al. (JP2003-073183) obtained from the JPO website.*
Machine English translation of Kajino et al. (JP 2003-238246) obtained from the JPO website.*
Abstract of Matsuura et al. (JP 03-177383) obtained from the JPO website.*

* cited by examiner

Primary Examiner—Timothy M Speer
Assistant Examiner—Jonathan C Langman
(74) Attorney, Agent, or Firm—Young & Thompson

(57) ABSTRACT

The long-term use of a conventional jig for calcining an electronic component arises a problem such as peel-off of a zirconia surface layer. Even if the performance is not deteriorated in the short-term use, the zirconia surface layer reacts with the electronic component to shorten the life of the jig for calcining the electronic component when the use is prolonged for a longer period of time. A jig for calcining an electronic component is provided which is stable after use of a longer period of time by suitably setting the composition of a zirconia surface layer. For example, in the zirconia surface layer containing zirconia particles and a partially fused-bonding agent, an amount of calcia is made to be 4 to 15% in weight.

5 Claims, 1 Drawing Sheet

PRIOR ART

JIG FOR ELECTRONIC PART FIRING

TECHNICAL FIELD

The present invention relates to a jig for calcining an electronic component such as a setter, a shelf board and a saggar for calcining the electronic component such as a dielectric, a multi-layered capacitor, a ceramic capacitor, a piezoelectric element and a thermistor.

BACKGROUND ART

A jig for calcining an electronic component is required to be unreactive with ceramic electronic components to be calcined in addition to having heat resistance and mechanical strength. When an electronic component work such as a dielectric is contacted and reacted with the calcination jig, a problem arises that the characteristics may be deteriorated due to the fusion or the composition fluctuation of the work.

The substrate for the jig for calcining the electronic component generally includes an alumina-based material, an alumina-mullite-based material, an alumina-magnesia-based-material, an alumina-mullite-cordierite-based material and a combination thereof.

In order to prevent the reaction of the jig with the work, a method of coating zirconia (zirconium oxide, $ZrO_2$) on the surface layer is employed. Although the reactivity of the zirconia with the substrate is low, the coating of the jig may be cleaved or peeled off under an environment in which the repeated heat cycles take place due to the larger difference between thermal expansion coefficients of the substrate and the zirconia. When the jig is repeatedly used and the particles contained in the surface zirconia layer has a lower particle removal resistance or a lower abrasion resistance, the fine particles are mixed into electronic components to cause a severe problem. The phase change from a monoclinic system to a tetragonal system takes place in the zirconia at around 1100° C. As a result, a problem arises that the change of the thermal expansion coefficient accompanied with the phase transformation due to the repeated heat cycles eliminates the coated layer of the zirconia to generate cracks so that electronic components to be calcined are likely to be influenced by the substrate. The use of non-stabilized zirconia easily takes place the degradation to lower the anti-grain detaching property.

An application method, a dip-coating method and a spray-coating method are used for forming the zirconia surface layer (or zirconia film) on the substrate surface of the jig for calcining the electronic component. In these methods relatively inexpensive and suitable for industrial production, the anti-grain detaching property and the anti-abrasion property of the formed zirconia surface layer may be insufficient. Especially, under the circumstance in which the heat cycles are repeatedly loaded on the jig for calcining the electronic component, the zirconia surface layer may be peeled off from the substrate and the grains may be detached.

When the zirconia surface layer is formed by using relatively coarse particles, the zirconia surface layer does not become compact, and a plenty of bubbles are formed to absorb the difference of thermal expansion from the substrate. However, the adhesiveness between the zirconia film and the substrate is inferior together with the decrease of the sintering property, thereby generating a cause of peel-off.

Patent Document 1: JP-A-10(1998)-13957 (paragraphs 0005 to 0007)
Patent Document 2: JP-A-2003-226586 (claim 1)
Patent Document 3: JP-A-2001-213666 (claim 1)
Patent Document 4: JP-A-2003-73183 (claim 2)

DISCLOSURE OF INVENTION

Problems to be Solved by Invention

Although various techniques have been proposed to overcome these defects, none of them can provide the sufficient peel-off resistance and anti-grain detaching property.

Such techniques are proposed that an amount of calcium is specified in a jig in contact with an electronic component for obtaining the jig in which cracks and peel-off are hardly generated (Patent Document 1), and calcium zirconate is sprayed on the surface of a jig (Patent Document 2). Both of them employ a spray method for forming the surface layers.

Further, a jig for calcining an electronic component having a surface layer formed by coarse zirconia particles and fine zirconia particles disclosed in Patent Document 3 exhibits excellent characteristics by excluding the peel-off and degradation of the surface layer due to the thermal cycles. However, in case of calcining barium titanate which is a dielectric material the chemical reaction between the barium titanate and the zirconia surface layer takes place after the jig is used for a longer period of time, though no problem arises after the use of several times. Then, the zirconia surface layer changes its nature to be easily peeled off.

This process will be described referring to FIGS. 1A to 1C.

In a jig for calcining an electronic component 4 configured by forming a zirconia surface layer 3 on the surface of a substrate 1 through intermediary of an intermediate layer 2 (FIG. 1A), barium titanate 5, for example, is calcined at higher temperature. After use for a longer period of time, the zirconia in the zirconia surface layer 3 gradually reacts with the barium titanate 5 to form a liquid phase 6 having eutectic composition. The liquid phase 6 gradually permeates the zirconia surface layer toward the substrate (FIG. 1B). The substrate 1 ordinarily contains a silica component. When the liquid phase reaches the substrate, the silica component in the substrate 1 is sucked into the zirconia surface layer (FIG. 1C). The silica mixed into the liquid phase lowers the viscosity of the liquid phase and incorporates the particles into the zirconia surface layer 3. When the jig is cooled, the liquid phase is significantly contracted to finally peel off the zirconia surface layer 3.

Although a countermeasure thereto is implied such that the formation of the liquid phase 6 is suppressed or the permeation of the liquid phase 6 is prevented, no specific proposal has been presented.

As described, a partially fused-bonding agent used in the jig for calcining the electronic component consists of a plurality of metal oxides, and a plenty of combinations among these metal oxides have been proposed and actually used. Only Patent Document 4 implies tantalum oxide (tantalum dioxide, tantalum pentaoxide) which is used in combination of aluminum as the partially fused-bonding agent having an amount of 0.5% in weight or more and less than 3% in weight in the zirconia surface layer.

An object of the present invention is to provide a jig for calcining an electronic component having a zirconia surface layer which has excellent adhesion with a substrate or excellent peel-off resistance and anti-grain detaching property by suitably setting the constitution of zirconia particles and a partially fused-bonding agent configuring the zirconia surface layer.

Means for Overcoming Problems

A first aspect of the present invention is a jig for calcining an electronic component comprising a substrate and a zirconia surface layer which is formed by zirconia particles bonded together by using a partially fused-bonding agent including a plurality of metal oxides containing calcia and is coated on the substrate characterized in that an amount of the calcia is 4 to 15% in weight of a total amount of the zirconia particles and the partially fused-bonding agent (hereinafter referred to as "first invention"). A second aspect of the present invention is a jig for calcining an electronic component comprising a substrate and a zirconia surface layer coated on the substrate; the zirconia surface layer being configured by coarse zirconia having an average particle diameter of 30 to 500 μm, fine zirconia having an average particle diameter of 0.1 to 10 μm and intermediary size zirconia having an average particle diameter between those of the coarse zirconia and the fine zirconia bonded with one another with a partially fused-bonding agent (hereinafter referred to as "second invention"). A third aspect of the present invention is a jig for calcining an electronic component comprising a substrate and a zirconia surface layer which is formed by zirconia particles bonded together by using a partially fused-bonding agent including a plurality of metal oxides and is coated on the substrate characterized in that an amount of the partially fused-bonding agent is 3 to 20% in weight of a total amount of the zirconia particles and the partially fused-bonding agent, and the partially fused-bonding agent further contains tantalum oxide (hereinafter referred to as "third invention"). In each of the inventions, an intermediate layer may be formed between the substrate and the zirconia surface layer.

The present invention will be described in detail.

Each of the first to the third inventions provides the jig for calcining the electronic component in which the zirconia surface layer formed on directly on the substrate or through intermediary of the intermediate layer on the substrate has the excellent peel-off resistance and anti-grain detaching property for a longer period of time.

First Invention

The present inventors have reached the first invention for obtaining the jig for calcining the electronic component having the more excellent long-term peel-off resistance than a conventional one by increasing, compared with a conventional one, the ratio of the calcia (calcium oxide), acting as part of the partially fused-bonding agent, contained in the zirconia surface layer with respect to the zirconia surface layer.

The effect of the calcia in the first invention is to suppress the liquid phase formation. That is, the formation of the liquid phase is suppressed to improve the long-term peel-off resistance by increasing, compared with a conventional one, the calcia content in the partially fused-bonding. While the calcia content in the conventional jig for calcining the electronic component was about 3% in weight in maximum, the calcia content in the first invention is set to be 4 to 15% in weight. While the improvement of the long-term peel-off resistance is insufficient below 4% in weight addition, the further improvement of the long-term peel-off resistance is not expected exceeding 15% in weight.

While the long-term peel-off resistance is elevated with the increase of the calcia content in the first invention, the substantial differences with respect to short-term peel-off resistance, warp and anti-grain detaching property are not observed in the range from 4 to 15% in weight.

The conventional combination between coarse zirconia and fine zirconia may be used, or another combination in which the intermediary size zirconia is added thereto can be also used as the zirconia particles configuring the zirconia surface layer. These zirconia particles will be described in the second invention.

The partially fused-bonding agent of the first invention contains the calcia and other at least one kind of metal oxide (including composite oxide), and the metal oxide includes alumina or alumina.magnesia based-spinel composite oxide ($Al_2MgO_4$) or rare earth oxide, transition metal oxide (including aluminum titanate composite oxide) and alikaine earth metal oxide. The rare earth oxide includes yttria (yttrium oxide), ceria (cerium oxide) and lanthanun oxide, the transition metal oxide includes titania (titanium oxide), niobium oxide and manganese oxide, and the alkaline earth metal oxide includes barium oxide and strontium oxide.

The particle diameter of the metal oxide in the partially fused-bonding agent can be selected in a range from 0.1 to 100 μm.

Second Invention

The present inventors have found that the jig for calcining the electronic component having the more excellent long-term peel-off resistance and anti-grain detaching property than a conventional one can be obtained by adding the intermediary size zirconia to the coarse zirconia and the fine zirconia configuring the conventional zirconia surface layer and have reached the second invention.

In case of the coarse zirconia and the fine zirconia, the fine zirconia goes among the coarse zirconia to reduce the porosity. However, many larger voids are still present in the conventional jig for calcining the electronic component, and the liquid phase permeates the voids to easily reach the substrate.

When the intermediary size zirconia is added as in the second invention, the voids are likely occupied by the intermediary size zirconia to further reduce the porosity. While the peel off accompanied with the thermal cycle is somewhat likely to occur due to the porosity reduction, the entire anti-peel-off resistance is elevated because the zirconia surface layer is compacted to suppress the liquid phase permeation to largely decrease the possibility of the peel-off due to the reaction.

The average particle size of the intermediary size zirconia of the second invention is between those of the coarse zirconia and the fine zirconia, and it is preferably 5 to 50 μm.

The blending ratio among the respective zirconia particles are desirably adjusted such that the anti-peel-off resistance increased by the addition of the intermediary size zirconia becomes maximum. For example, the coarse zirconia having the average particle size of 30 to 500 μm is 30 to 60% in weight, the intermediary size zirconia having the average particle size of 5 to 50 μm is 10 to 40% in weight, and the fine zirconia having the average particle size of 0.1 to 10 μm is 10 to 50% in weight.

When the average particle size of the coarse zirconia is below 30 μm, the stress relaxing effect generated by the thermal expansion difference with the substrate is smaller to make the peel-off. On the other hand, when the average particle size of the coarse zirconia exceeds 500 μm, the sintering property is deteriorated. When the average particle size of the fine zirconia is below 0.1 μm, the particle size difference with the coarse zirconia is so large that the effect of elevating the tightness between the coarse zirconia and the substrate is made smaller. When it exceeds 10 μm, the fine zirconia diameter approaches to the intermediary size zirconia diameter to reduce the effect of the fine zirconia addition.

The weight ratio among the coarse zirconia, intermediary size zirconia and fine zirconia is desirably in from 60:15:25, 40:35:25 to 40:15:45. Out of this region, the sintering property is worsened to generate the peel-off because the thermal expansion difference cannot be absorbed.

In consideration of the reactivity with the electronic component, non-stabilized zirconia, partially-stabilized zirconia stabilized zirconia or a combination thereof is desirably used as the coarse zirconia. The stabilization or the partial stabilization can be attained by the addition of yttria ($Y_2O_3$), calcia (CaO) or magnesia (MgO) to the zirconia.

The zirconia is a monoclinic system at ambient temperature, and the phase change takes place with the temperature rise from monoclinic system→(1170° C.)→tetragonal system→(2370° C.) to cubic system. The higher temperature phases such as the tetragonal system and the cubic system can be "stabilized" under the ambient temperature by solid-solubilizing a partially fused-bonding agent (stabilizing agent) such as yttria and magnesia in the zirconia. Although the volume change occurs in the non-stabilized zirconia due to the phase transformation from the monoclinic system to the tetragonal system, no phase transformation takes place in the stabilized zirconia in which the partially fused-bonding agent is solid-solubilized.

The partially fused-bonding agent added in the second invention is not especially restricted, and is two or more metal oxides selected from alumina, rare earth oxides, transition metal oxides (including aluminum titanate composite oxide) and alkaline earth metal oxides.

The particle diameter of the metal oxide in the partially fused-bonding agent can be selected in a range from 0.1 to 100 μm.

The partially fused-bonding agent containing these metal oxides elevates the strength of the zirconia surface layer during the calcinations by bonding the coarse zirconia, the intermediary size zirconia and the fine zirconia.

The zirconia surface layer (zirconia film) on the substrate surface can be formed by using a conventional method such as a method in which a zirconia compound solution is applied and thermally decomposed, a method in which the zirconia powders are spray-coated and a method in which a substrate dipped in the zirconia compound solution is thermally decomposed such that the compound is converted into zirconia.

The substrate used may be the same as a conventional one such as an aluminum-based material, an alumina-mullite-based material, an alumina-magnesia-based spinel material, an alumina-mullite-cordierite-based material or the combination thereof already described.

The intermediate layer may be formed between the substrate and the zirconia surface layer in place of direct formation of the zirconia surface layer on the substrate surface. The intermediate layer may be made of alumina, alumina-zirconia or alumina-magnesia-based spinel. The existence of the intermediate layer makes excellent the matching between the zirconia surface layer and the substrate, thereby preventing the diffusion of elements such as silica contained in the substrate and harmful to the electronic components toward the surface. The intermediate layer formation on the substrate surface can be conducted by using the spray-coat method or the dip-coat method.

The temperature for calcining the zirconia surface layer is desirably higher than that at which the electronic component is actually calcined, thereby preventing the deterioration of the jig for calcining the electronic component during the use. Since the temperature for calcining the jig for calcining the electronic component is ordinarily from 1200 to 1400° C., the temperature for calcining the zirconia layer is preferably from 1300 to 1600° C.

Impurities such as zinc oxide, bismuth oxide, sodium oxide and silicon oxide other than the metal oxides contained in the zirconia surface may promote the reaction. However, in this case, an amount of the impurities is preferably 1% in weight or less and 5% in weight at the maximum.

Third Invention

The present inventors have found that the jig for calcining the electronic component having the more excellent long-term peel-off resistance and anti-grain detaching property than a conventional one can be obtained by using tantalum oxide as part of the partially fused-bonding agent in the zirconia surface layer, and have reached the third invention.

As described earlier, the use of the tantalum oxide is only implied in combination with aluminum as the partially fused-bonding agent having an amount of 0.5% in weight or more and less than 3% in weight, and no effect is known which is proved by experimental data. That is, it is uncertain whether the performance of the jig for calcining the electronic component is elevated or not by actually adding the tantalum oxide to the partially fused-bonding agent.

The third invention has been established by proving the usefulness of the tantalum oxide as the partially fused-bonding agent which is not substantially known to be used as the partially fused-bonding agent.

When the tantalum oxide is used as one metal oxide among a plurality of meta oxides configuring the partially fused-bonding agent, a longer life of the jig for calcining the electronic component can be achieved, especially because of the long-term peel-off resistance. The longer life is remarkable when the content of the partially fused-bonding agent is 3% in weight or more and 20% in weight or less, and this tantalum oxide addition is also effective when the above intermediary size zirconia is added.

The preferable tantalum content is from 1 to 5% in weight with respect to the entire amount of the zirconia surface layer.

The partially fused-bonding agent of the third invention includes the tantalum oxide and another at least one metal oxide (composite oxide), and the metal oxide includes alumina, alumina-magnesia-based spinel composite oxide ($Al_2MgO_4$), rare earth oxide, transition metal oxide (including aluminum titanate composite oxide) and alkaline earth metal oxide. The rare earth oxide includes yttria, ceria and lanthanum oxide, the transition metal oxide includes titania, niobium oxide and manganese oxide, and the alkaline earth metal oxide includes calcia, barium oxide and strontium oxide.

The particle diameter of the metal oxide in the partially fused-bonding agent can be selected in a range from 0.1 to 100 μm.

EFFECT OF INVENTION

As described, the composition of the zirconia surface layer suitably configured improves the peel-off resistance after the long-term use among the various performances of the jig for calcining the electronic component in the first to the third inventions.

BEST MODE FOR IMPLEMENTING INVENTION

While Examples of fabrication of the jig for calcining the electronic component of the present invention will be described, the present invention shall not be restricted thereto.

Example 1

An alumina-mullite substrate having about 10% in weight of silica component was used as a substrate.

70% in weight of alumina coarse aggregate having 100 mesh, and 27% in weight, 2% in weight and 1% in weight of alumina fine powder, calcia fine powder and yttria fine powder, respectively, were provided. These were uniformly mixed in a ball-mill to prepare slurry by adding water and polyvinyl alcohol acting as a binder. The slurry was spray-coated on the substrate surface to make an intermediate layer after drying at about 100° C. Thickness of the intermediate layer was about 100 μm.

72% in weight of yttria-stabilized zirconia aggregate having 100 mesh acting as coarse aggregate (coarse zirconia) and 28% in weight of non-stabilized zirconia powder having an average particle diameter of 1 μm acting as fine bond phase (fine zirconia) for the zirconia surface layer were provided.

As a sintering aid (partially fused-bonding agent), 4% in weight of calcia, 1% in weight of alumina and 1% in weight of yttria (6% in weight with respect to the total amount) were provided.

The coarse zirconia, the fine zirconia and the partially fused-bonding agent were uniformly mixed in a ball-mill to prepare slurry by adding water and polyvinyl alcohol acting as a binder. The slurry was spray-coated on the intermediate layer to make a zirconia surface layer after drying at about 100° C. Thickness of the zirconia surface layer was about 100 μm. The two-layer stack was held at 1450° C. for two hours to fabricate the jig for calcining the electronic component.

In order to investigate the resistance of the zirconia surface layer of the jig for calcining the electronic component against peel-off accompanied with thermal cycles, warp and grain detaching property, 50 thermal cycles were repeated on the above jig for calcining the electronic component in which the jig was rapidly heated to 1300° C. and then was rapidly cooled to ambient temperature. As a result, neither peel-off, warp nor grain detaching was observed. These results are shown in Table 1.

Then, in order to investigate the long-term peel-off resistance, after a sheet made of barium titanate was placed on the jig for calcining the electronic component, 10 thermal cycles were repeated in which the jig was rapidly heated to 1300° C. and then was rapidly cooled to ambient temperature. Thereafter, whether or not the appearance of the peel-off and reaction trace existed was observed. As a result, no peel-off was observed and the reaction trace was observed. This indicates that while the reaction between the zirconia and the barium titanate took place which exerted no influence on the peel-off of the zirconia surface layer. These results are shown in Table 1.

In the evaluation in Table 1 with respect to the peel-off and the reaction trace after the long-term use, "⊚" indicates excellent and neither the peel-off nor reaction trace was observed at all. "○" indicates good and no peel-off and the slight reaction trace were observed, "Δ" indicates ordinary, and no peel-off and the reaction trace were observed, and "X" indicates that the peel-off or a lot of the reaction trace was observed, and the continuing use was not possible, Example 2

A jig for calcining an electronic component was fabricated under the same conditions as those of Example 1 except that 74% in weight of the coarse zirconia, 16% in weight of the fine zirconia and 8% in weight of calcia (10% in weight of the total partially fused-bonding agent) were used, and the resistance test was conducted similarly to that of Example 1. As a result, neither the peel-off, the warp nor the grain detaching was observed. Further, no long-term peel-off was present, and the reaction trace observed in Example 1 was only slightly observed. These results are shown in Table 1.

Example 3

A jig for calcining an electronic component was fabricated under the same conditions as those of Example 1 except that 72% in weight of the coarse zirconia, 15% in weight of the fine zirconia and 11% in weight of calcia (13% in weight of the total amount) were used, and the resistance test was conducted similarly to that of Example 1. As a result, neither the peel-off, the warp nor the grain detaching was observed. Further, no long-term peel-off was present, and the reaction trace observed in Example 1 was not observed. These results are shown in Table 1.

Example 4

In the present Example, calcium-stabilized zirconia was added as intermediary size zirconia having an average particle size of about 10 μm, in addition to the coarse zirconia and the fine zirconia. A jig for calcining an electronic component was fabricated under the same conditions as those of Example 1 except that 45% in weight of the coarse zirconia, 27% in weight of the intermediary size zirconia, 25% in weight of the fine zirconia, 0.9% in weight of calcia, 0.7% in weight of alumina and 1.4% in weight of yttria (3% in weight of the total amount) were used, and the resistance test was conducted similarly to that of Example 1. As a result, neither the peel-off, the warp nor the grain detaching was observed. Further, no long-term peel-off was present, and the reaction trace observed in Example 1 was observed. These results are shown in Table 1.

Example 5

A jig for calcining an electronic component was fabricated under the same conditions as those of Example 1 except that 46% in weight of the coarse zirconia, 20% in weight of the intermediary size zirconia, 17% in weight of the fine zirconia, 14% in weight of calcia, 1% in weight of alumina and 2% in weight of yttria (17% in weight of the partially fused-bonding agent with respect to the total amount) were used, and the resistance test was conducted similarly to that of Example 1. As a result, neither the peel-off, the warp nor the grain detaching was observed. Further, no long-term peel-off was present, and the reaction trace was not observed. These results are shown in Table 1.

Example 6

In the present Example, the intermediary size zirconia was excluded, and tantalum pentaoxide was added as the partially fused-bonding agent in addition to the calcia, the alumina and the yttria. A jig for calcining an electronic component was fabricated under the same conditions as those of Example 1 except that 72% in weight of the coarse zirconia, 22% in weight of the fine zirconia, 0.9% in weight of calcia, 0.7% in weight of alumina, 1.4% in weight of yttria and 3% in weight of the tantalum pentaoxide (6% in weight of the partially fused-bonding agent with respect to the total amount) were used, and the resistance test was conducted similarly to that of Example 1. As a result, neither the peel-off, the warp nor the grain detaching was observed. Further, no long-term peel-off was present, and the reaction trace was not observed. These results are shown in Table 1.

Example 7

In the present Example, the intermediary size zirconia was added. That is, a jig for calcining an electronic component was fabricated under the same conditions as those of Example 6 except that 43% in weight of the coarse zirconia, 19% in weight of the intermediary size zirconia, 25% in weight of the fine zirconia, 8% in weight of calcia, 1% in weight of alumina, 1% in weight of yttria and 3% in weight of the tantalum pentaoxide (13% in weight of the partially fused-bonding agent with respect to the total amount) were used, and the resistance test was conducted similarly to that of Example 6. As a result, neither the peel-off, the warp nor the grain detaching was observed. Further, no long-term peel-off was present, and the reaction trace was not observed. These results are shown in Table 1.

Comparative Example 1

A jig for calcining an electronic component was fabricated under the same conditions as those of Example 1 except that 70% in weight of the coarse zirconia, 27% in weight of the fine zirconia, 0.9% in weight of calcia, 0.7% in weight of alumina and 1.4% in weight of yttria (3% in weight of the total partially fused-bonding agent) were used, and the resistance test was conducted similarly to that of Example 1. As a result, neither the peel-off nor the warp was observed, and the grain detaching was slightly observed. The zirconia surface layer was peeled off after the long-term use. These results are shown in Table 1.

Comparative Example 2

A jig for calcining an electronic component was fabricated under the same conditions as those of Comparative Example 1 except that 65% in weight of the coarse zirconia, 25% in weight of the fine zirconia, 3% in weight of calcia, 2.3% in weight of alumina and 4.7% in weight of yttria (10% in weight of the total partially fused-bonding agent) were used, and the resistance test was conducted similarly to Comparative Example 1. As a result, no grain detaching was observed, and the peel-off and the warp were slightly observed. The zirconia surface layer was peeled off after the long-term use. These results are shown in Table 1.

Consideration on Examples and Comparative Examples

The calcia contents in Comparative Example 1, Examples 1 to 3 were 0.9% in weight, 4% in weight, 8% in weight and 11% in weight in this order. Based on the difference of these calcia contents, the long-term peel-off resistance was improved in the order of X→Δ→○→◎, and it was conjectured that this improvement was achieved by the suppression of the liquid phase formation caused by the increase of the calcia content.

Among the respective Examples, Examples 3, and 5 to 7 had the excellent (◎) long-term peel-off resistance. Among these, Examples 5 and 7 had the zirconia surface layer containing the intermediary size zirconia.

The long-term peel-off resistance was improved by the addition of the tantalum oxide as is apparent from the comparison between Example 6 and Comparative Example 1, wherein the calcia amount was the same in both, no intermediary size zirconia was contained in both, and only the presence or the absence of the tantalum oxide was different from each other in connection with the addition of the tantalum oxide. Further, in Example 6, the calcia amount in Example 1 was reduced and the tantalum oxide having the corresponding reduced amount was added therein, thereby improving the long-term peel-off resistance.

Figure 1A:
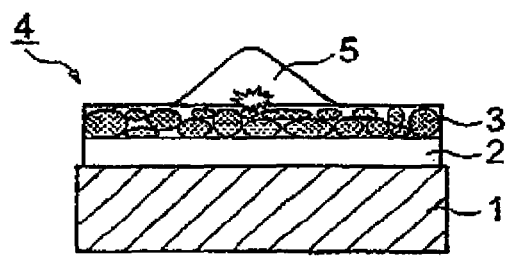
FIGS. 1A to 1C are sectional views schematically showing a process of peel-off of a zirconia surface layer.
Figure 1B:
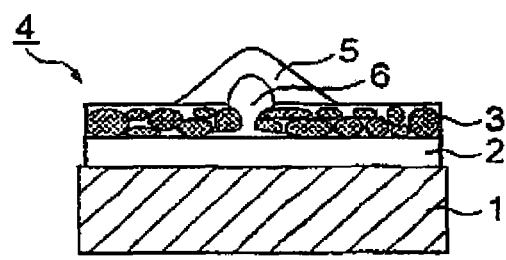
Figure 1C:
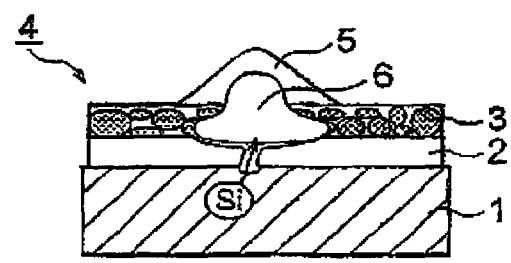

The invention claimed is:

1. A jig for calcining an electronic component comprising:
   a substrate; and
   a zirconia surface layer coated on said substrate,
   said zirconia surface layer comprising zirconia particles bonded together with a partially fused-bonding agent, the partially fused-bonding agent including a plurality of metal oxides containing calcia and tantalum oxide,
   wherein the zirconia particles and the partially fused-bonding agent together are a first weight amount, and the calcia is 4 to 15% in weight of the first weight amount.

TABLE 1

| | | Example 1 | Example 2 | Example 3 | Example 4 | Example 5 | Example 6 | Example 7 | Comp. Ex. 1 | Comp. Ex. 2 |
|---|---|---|---|---|---|---|---|---|---|---|
| Coarse Particle | Y-stabilized zirconia (100 mesh) | 72 | 74 | 72 | 45 | 46 | 72 | 43 | 70 | 65 |
| Intermediary Size particle | Ca-stabilized zirconia (10 μm) | | | | 27 | 20 | | 19 | | |
| Fine Particle | Non-stabilized zirconia (1 μm) | 22 | 16 | 15 | 25 | 17 | 22 | 25 | 27 | 25 |
| Bonding Agent | Total Amount | 6 | 10 | 13 | 3 | 17 | 6 | 13 | 3 | 10 |
| | CaO | 4 | 8 | 11 | 0.9 | 14 | 0.9 | 8 | 0.9 | 1 |
| | Al2O3 | 1 | 1 | 1 | 0.7 | 1 | 0.7 | 1 | 0.7 | 2.3 |
| | Y2O3 | 1 | 1 | 1 | 1.4 | 2 | 1.4 | 1 | 1.4 | 4.7 |
| | Ta2O5 | | | | | | 3 | 3 | | |
| Evaluation | Peel-off due to thermal cycle | ◎ | ◎ | ◎ | ◎ | ◎ | ◎ | ◎ | ◎ | ○ |
| | Warp | ◎ | ◎ | ◎ | ◎ | ◎ | ◎ | ◎ | ◎ | ○ |
| | Grain detaching | ◎ | ◎ | ◎ | ◎ | ◎ | ◎ | ◎ | ○ | ◎ |
| | Long-term peel-off and reaction trace | Δ | ○ | ◎ | Δ | ◎ | ◎ | ◎ | X | X |

% in weight

2. The jig for calcining the electronic component as defined in claim 1, wherein the zirconia surface layer is a spray coating layer.

3. The jig for calcining the electronic component as defined in claim 1, wherein the zirconia surface layer comprising first size zirconia particles having an average particle diameter of 30 to 500 μm, second size zirconia particles having an average particle diameter of 0.1 to 10 μm, and third size zirconia particles having an average particle diameter between the size of the first size zirconia particles and the second size zirconia particles bonded, the first, second, and third size zirconia particles being bond to one another with the partially fused-bonding agent.

4. A jig for calcining an electronic component comprising:
a substrate; and
a zirconia surface layer coated on said substrate,
the zirconia surface layer comprising zirconia particles bonded together by a partially fused-bonding agent,
the partially fused-bonding agent including a plurality of metal oxides,
the partially fused-bonding agent comprising tantalum oxide,
wherein the zirconia particles and the partially fused-bonding agent together are a first weight amount, and the partially fused-bonding agent is 3 to 20% in weight of the first weight amount.

5. The jig for calcining the electronic component as defined in claim 4, wherein an amount of the tantalum oxide is 1 to 5% in weight of the first weight amount.

* * * * *